(12) United States Patent
Wang et al.

(10) Patent No.: US 9,872,085 B2
(45) Date of Patent: *Jan. 16, 2018

(54) ADDING CONTENT DURING DATA STREAM ACQUISITION

(71) Applicant: GOOGLE TECHNOLOGY HOLDINGS LLC, Mountain View, CA (US)

(72) Inventors: Yeqing Wang, Horsham, PA (US); Brian D. Mullen, Duluth, GA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,802

(22) Filed: Feb. 12, 2016

(65) Prior Publication Data

US 2016/0241931 A1    Aug. 18, 2016

Related U.S. Application Data

(63) Continuation of application No. 12/640,818, filed on Dec. 17, 2009, now Pat. No. 9,271,034.

(51) Int. Cl.
*H04N 7/10* (2006.01)
*H04N 21/81* (2011.01)
(Continued)

(52) U.S. Cl.
CPC ..... *H04N 21/8126* (2013.01); *H04N 21/4331* (2013.01); *H04N 21/4384* (2013.01); *H04N 21/44016* (2013.01); *H04N 21/812* (2013.01)

(58) Field of Classification Search
CPC .. H04N 21/43; H04N 21/433; H04N 21/4331; H04N 21/44; H04N 21/44016;
(Continued)

(56) References Cited

U.S. PATENT DOCUMENTS 5,446,490 A * 8/1995 Blahut ................. H04N 21/434
348/E5.005
2002/0087973 A1* 7/2002 Hamilton ............. H04N 5/4401
725/32
(Continued)

FOREIGN PATENT DOCUMENTS

CN    1503554 A    6/2004
CN    1592375 A    3/2005
(Continued)

OTHER PUBLICATIONS

KIPO's Notice of Preliminary Rejections application No. 10-2012-7015656 (English Translation), dated Sep. 24, 2013.

*Primary Examiner* — Farzana Hossain
(74) *Attorney, Agent, or Firm* — Lowenstein Sandler LLP

(57) ABSTRACT

A method is provided for adding extended content data during data stream acquisition. The method includes receiving a request for a transition from a first data stream to a second data stream within a transitioning time period. The method also includes determining whether a timing of the transition is sufficient for insertion of at least a first portion of extended content data during the transition. The method also includes selecting the first portion of the extended content data as insertion content if the timing of the transition is sufficient for insertion of the first portion of the extended content data. The method also includes selecting a second portion of the extended content data as the insertion content if the timing is insufficient for insertion of the first portion of the extended content. The method also includes causing the insertion content to be presented to a user during the transition.

20 Claims, 14 Drawing Sheets

(51) Int. Cl.
*H04N 21/44* (2011.01)
*H04N 21/433* (2011.01)
*H04N 21/438* (2011.01)

(58) Field of Classification Search
CPC . H04N 21/4402; H04N 21/81; H04N 21/8126
USPC .............................................. 725/32, 34–36
See application file for complete search history.

(56) References Cited

U.S. PATENT DOCUMENTS

| | | |
|---|---|---|
| 2005/0076391 A1 | 4/2005 | Sugiyama et al. |
| 2005/0097599 A1 | 5/2005 | Plotnick et al. |
| 2008/0301746 A1 | 12/2008 | Wiser et al. |
| 2009/0249383 A1 | 10/2009 | Christian |
| 2010/0166389 A1 | 7/2010 | Knee et al. |
| 2011/0154389 A1 | 6/2011 | Wang et al. |

FOREIGN PATENT DOCUMENTS

| | | |
|---|---|---|
| CN | 101080887 A | 11/2007 |
| JP | 2002-051325 A | 2/2002 |
| KR | 1020030052647 A | 6/2003 |
| WO | 2011/084305 A2 | 7/2011 |

\* cited by examiner

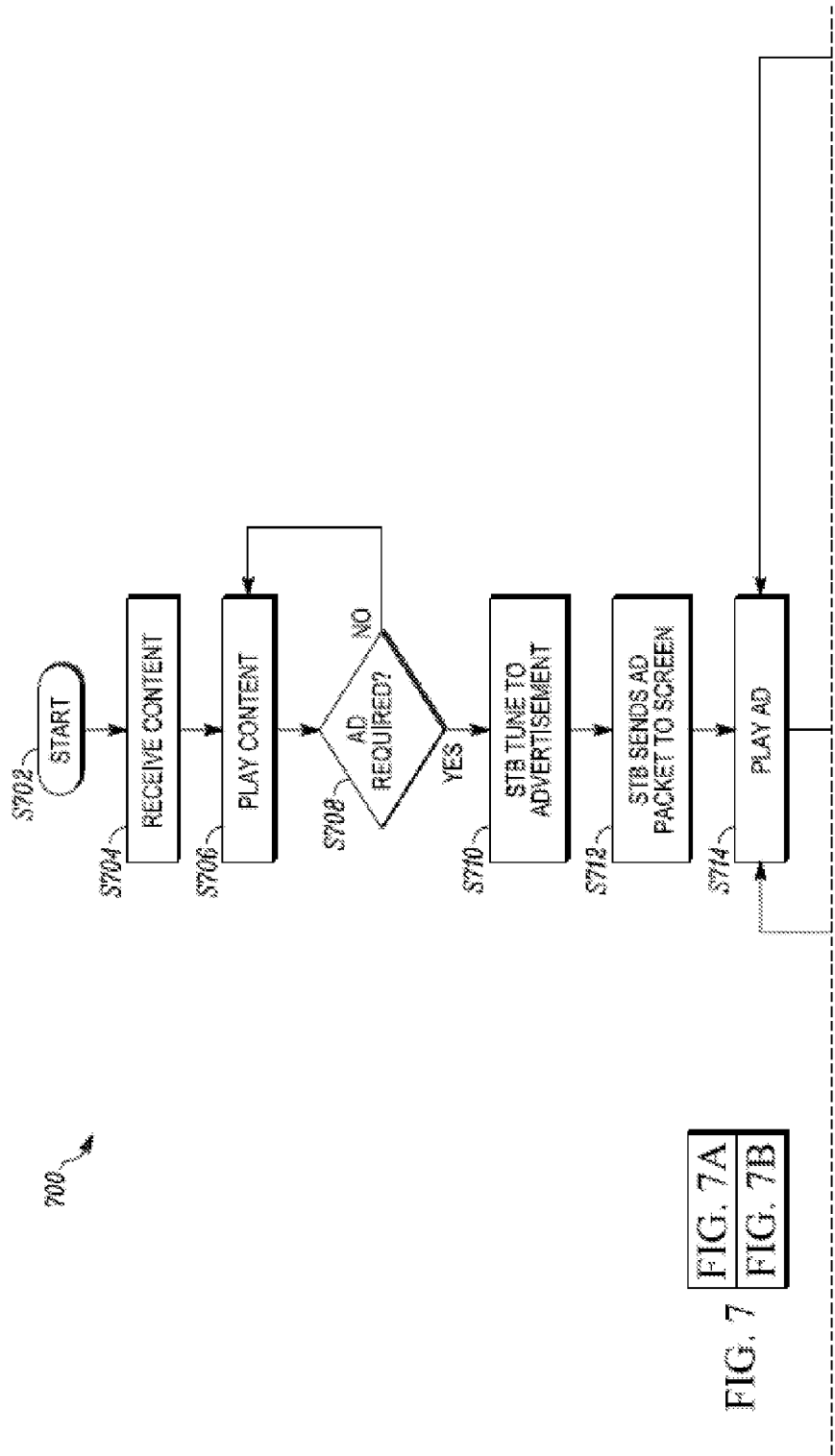

ADDING CONTENT DURING DATA STREAM ACQUISITION

RELATED APPLICATION

This application is a continuation of U.S. patent application Ser. No. 12/640,818, filed Dec. 17, 2009, which is hereby incorporated by reference in its entirety.

BACKGROUND

The advertisement industry is always thinking of new methods of reaching the most consumers at a minimal cost. One of these methods involves only distributing select advertisements to consumers who will likely be interested in the products or services in those selected advertisements. This method is called addressable advertising.

FIG. 1A illustrates an example conventional distribution system 100.

As illustrated in the figure, distribution system 100 includes a set-top box 102 and a service provider 104. Service provider 104 includes a network content provider 106 and an advertisement library 110. Network content provider 106 includes network content to be provided to set-top box 102. Advertisement library 110 contains a plurality of advertisements, including an advertisement content 112, an advertisement content 114, an advertisement content 116 and an advertisement content 118. Set-top box 102 includes a processing portion 120 and an acquisition portion 122.

Set-top box 102 is operable to receive information from service provider 104 through a plurality of data streams, including a data stream 126, a data stream 128, a data stream 130, a data stream 132 and a data stream 134. Set-top box 102 is further operable to output a signal 140 to a television (not shown). A data stream may be any stream of data that flows from a source to a destination, for example video data from a service provider to a set-top box.

Network content provided by network content provider 106 is arranged to be transmitted though data stream 126. Advertisement content 112 is arranged to be transmitted through data stream 134. Advertisement content 114 is arranged to be transmitted through data stream 132. Advertisement content 116 is arranged to be transmitted through data stream 130. Advertisement 118 is arranged to be transmitted through data stream 128.

Processing portion 120 is arranged to receive and process data from any one of data streams 126, 128, 130, 132 and 134 by way of acquisition portion 122. Acquisition portion 122 is operable to acquire one of data streams 126, 128, 130, 132 and 134 and to provide content respectively thereon to processing portion 120.

In operation, set-top box 102 is used to present desired content, for example a movie, on a specific data stream. To accomplish this, processing portion 120 instructs acquisition portion 122 to acquire a data stream where the desired content, e.g., movie, is being transmitted. When a data stream is acquired, acquisition portion 122 may forward content to processing portion 120 to be processed and output as signal 140 to a television.

Transitioning may be any known form of changing from one data stream to another data stream, non-limiting examples of which include; a set-top box changing from receiving one frequency to receiving another frequency on a broadcast television system; a service provider changing from providing one frequency to a set-top box to providing another frequency to the set-top box on a switched digital video television system; and changing from one service provider to another service provider on an Internet Protocol television system. The time needed and the actions needed for this transition process are dependent on the type of set-top box and service provider in use. Also, processing portion 122 is not able to present content or advertisements while acquisition portion 122 is transitioning from one data stream to another data stream. For example, if a user is watching a television program and decides to change the data stream, the set-top box will not present anything while it is transitioning to the new data stream. This is called dead air.

For purposes of explanation, in distribution system 100, presume acquisition portion 122 is arranged to acquire data stream 126 to receive network content provided by network content provider 106. Before network content provided by network content provider 106 can be transmitted to set-top box 102, network content provider 106 arranges the content such that gaps for advertisements are present, creating a network content packet 124.

Network content packet 124 includes information set-top box 102 will use to present network content provided by network content provider 106. This may include audio and video portions of network content provided by network content provider 106. Network content packet 124 will also include a given time to start the advertisement break. An indicator for set-top box 102 to change data streams, i.e., a transition signaling, is typically contained in a known packet identifier on the data stream that set-top box 102 is currently receiving. This signaling will not be available while transitioning from one data stream to another data stream. An illustration of this can be found in FIG. 2.

FIG. 2 illustrates how content and advertisements are combined in set-top box 102.

As illustrated in the figure, an advertisement break 202 is included in network content provided by network content provider 106. Advertisement break 202 can be of any predetermined length of time to accommodate a predetermined number of advertisements and allocate the appropriate time needed for transitioning from one data stream to another data stream. In this example, advertisement break is long enough to accommodate two advertisements, advertisement content 114 and advertisement content 118, and three times for transitioning, a transitioning time 204, a transitioning time 206 and a transitioning time 208.

As discussed previously, transitioning times can vary depending on the type of set-top box and the service provider being used, for example, some set-top boxes may have a transitioning time of two seconds, whereas other set-top boxes may have a transitioning time of 1 second. Presume for purposes of discussion, in this example, transitioning times 204, 206 and 208 each have a duration of two seconds. In other words, it will take set-top box 102 two seconds to transition from acquiring one data stream to acquiring another data stream.

When it is time to transition to the first addressable advertisement, processing portion 120 instructs acquisition portion 122, by way of signal 136 to transition to the data stream where that advertisement can be found. This is illustrated in FIG. 1B.

FIG. 1B illustrates distribution system 100 when set-top box 102 is acquiring to the first target advertisement.

As illustrated in FIG. 1B, network content packet 124 is no longer being delivered to set-top box 102. Processing portion 120 has instructed acquisition portion 122 to transition to data stream 132, which is now receiving an advertisement content packet 136.

Advertisements can be of any length and in reality there are many standard lengths used by the advertising industry. These lengths consider the transitioning time needed by processing portion 120. For example, advertisements may have a duration of 13 seconds, 28 seconds or 58 seconds, each allowing for a two-second transitioning time. In this example and for purposes of discussion, all advertisements will have a duration of 28 seconds. Returning to FIG. 2, since advertisement content 114 and advertisement content 118 each have a duration of 28 seconds, advertisement break 202 will have a duration of 62 seconds.

Returning to FIG. 1B, advertisement content packet 136 includes information similar to network content packet 124. Advertisement content packet 136 includes audio and video portions of advertisement content 114 that will be used by acquisition portion 122 to present advertisement content 114. Advertisement content packet 136 also includes a predetermined time at which the set-top box will begin to transition to either the next advertisement or to the next content data stream.

As previously discussed, processing portion 120 will instruct acquisition portion 122 to begin to transition to the next data stream after advertisement content 114 has been presented. Nothing will be presented while acquisition portion 122 is transitioning to the next data stream.

In this example, after presenting advertisement content 114, processing portion 120 instructs acquisition portion 122 to begin to transition to the second addressable advertisement. This is illustrated using FIG. 1C.

FIG. 1C illustrates distribution system 100 when acquisition portion 122 has transitioned to the second addressable advertisement.

As illustrated in the figure, advertisement content packet 136 is no longer being delivered to set-top box 102. Acquisition portion 122 has transitioned to data stream 128 and is now receiving an advertisement content packet 138.

As discussed with reference to advertisement content packet 136, advertisement packet 138 contains audio and video components of advertisement content 118, and the predetermined time when processing portion 120 instructs acquisition portion 122 to transition to the next data stream. In this example, processing portion 120 will instruct acquisition portion 122 to transition to data stream 126 after 28 seconds of advertisement content 118 has been presented. Referring to FIG. 1A and FIG. 2, set-top box 102 will continue to present network content provided by network content provider 106 and the process described above may repeat.

Returning to FIG. 2, the string of content and advertisements presented by set-top box 102 is illustrated by final content 210. As illustrated and described previously, two seconds between each transition results in dead air, wherein nothing is presented.

What is needed is a method of reducing dead air time while the set-top box is transitioning to the next data stream.

BRIEF SUMMARY

The present invention provides a system and method of reducing dead air time while the set-top box is transitioning to the next data stream.

In accordance with an aspect of the present invention, a device is provided for use with extended content data on a first data stream and second content data on a second data stream. The device includes a processing portion, an acquisition portion and a buffer. The acquisition portion is in communication with the processing portion. The acquisition portion can acquire the first data stream, can transition from the first data stream to acquire the second data stream to receive the second content data and can provide the second content data to the processing portion. The buffer can receive the extended content data. The processing portion can instruct the acquisition portion to transition from the first data stream to the second data stream to receive the second content data. The buffer can further provide the extended content data to the processing portion based on the acquisition portion transitioning from the first data stream to the second data stream. The processing portion can further process the extended content data portion as received from the buffer.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of the present invention, a delivery system allows additional content to be delivered to a set-top box, wherein the set-top box may present this content while transitioning to a new data stream. As such, advertisers may have access to additional time for advertising content, which in turn may provide additional revenue for content providers.

In an example embodiment, extra content includes a predetermined amount of additional advertising content that may be added to the end of an original advertisement. This would provide a seamless viewing of one advertisement to another advertisement, even while the set-top box changes data streams.

In one example, the extra content lasts for two seconds. When the set-top box begins transitioning after a 28 second advertisement has presented, the extra content may present as an additional two seconds of the advertisement. This extra content would replace the otherwise dead air time.

In accordance with another aspect of the present invention, in the event extra content is not available for the set-top box to present while transitioning from one data stream to another data stream, still images pertaining to the advertisement may be presented. In other words, if the set-top box is unable to download the extra content before the designated transitioning time, a still image would be presented during the otherwise dead air time.

In accordance with another aspect of the present invention, in the event extra content corresponding to network content is not available for the set-top box to present while transitioning, still images pertaining to an advertisement may be presented. In other words, if the set-top box is unable to download the extra network content before the designated transitioning time, a still image of an advertisement would be presented during the otherwise dead air time.

An example method of providing extra content to a set-top box in accordance with an aspect of the present invention will now be described in more detail with reference to FIGS. 3A-7.

Figure 3A:
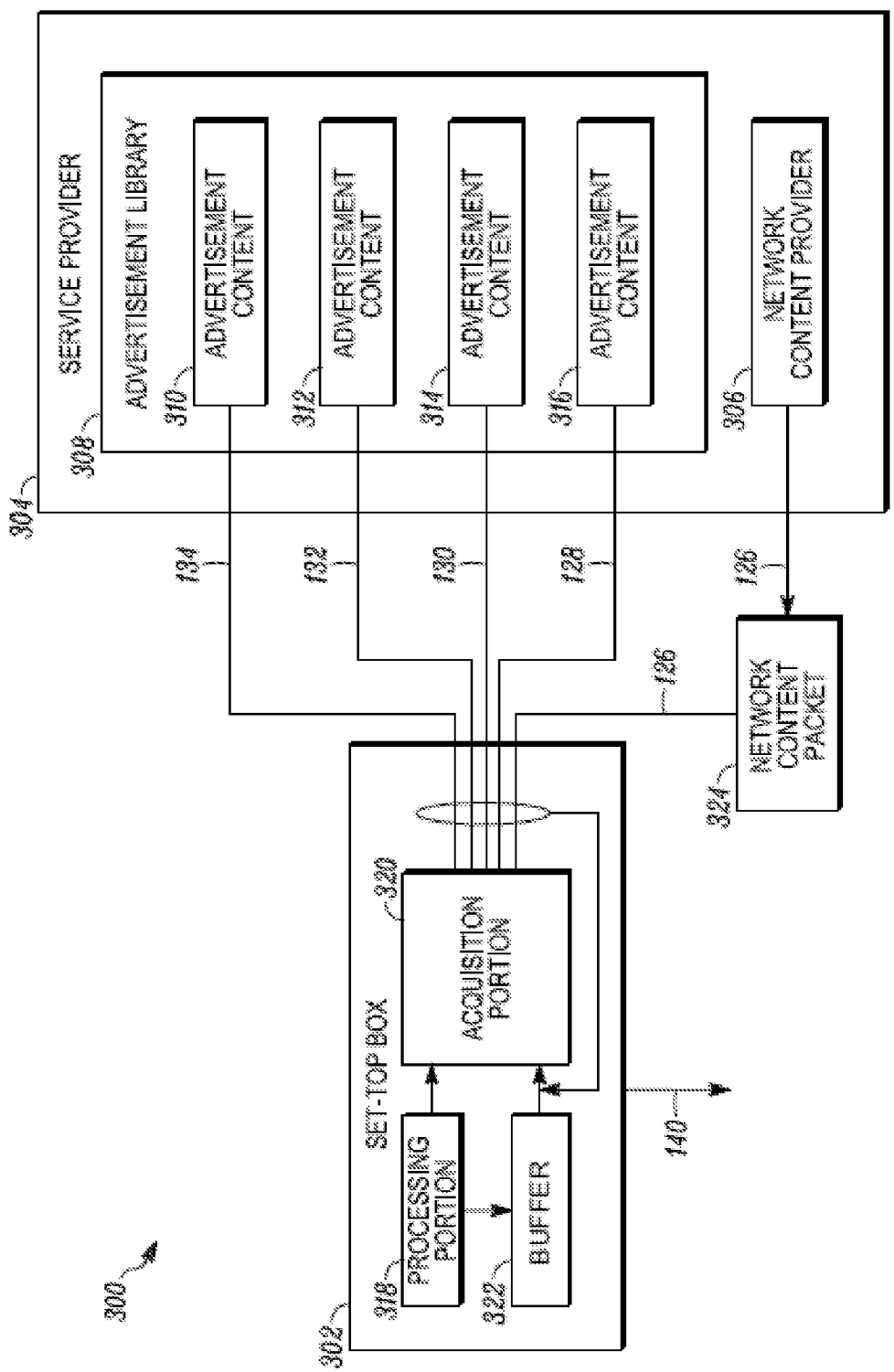
FIG. 3A illustrates an example distribution system in accordance with an aspect of the present invention, when arranged to acquire a content data stream.

FIG. 3A illustrates an example distribution system 300 in accordance with an aspect of the present invention.

As illustrated in the figure, distribution system 300 includes a set-top box 302 and a service provider 304. Service provider 304 includes a network content provider 306 and an advertisement library 308. Network content provider 306 includes network content and extra network content to be provided to set-top box 302. Advertisement library 308 contains a plurality of advertisements, including an advertisement content 310, an advertisement content 312, an advertisement content 314 and an advertisement content 316. Set-top box 302 includes a processing portion 318, an acquisition portion 320 and a buffer 322.

Set-top box 302 is operable to receive information from service provider 304 through a plurality of data streams, including data stream 126, data stream 128, data stream 130, data stream 132 and data stream 134. Set-top box 302 is further operable to output a signal 140 to a television (not shown).

Figure 1A:
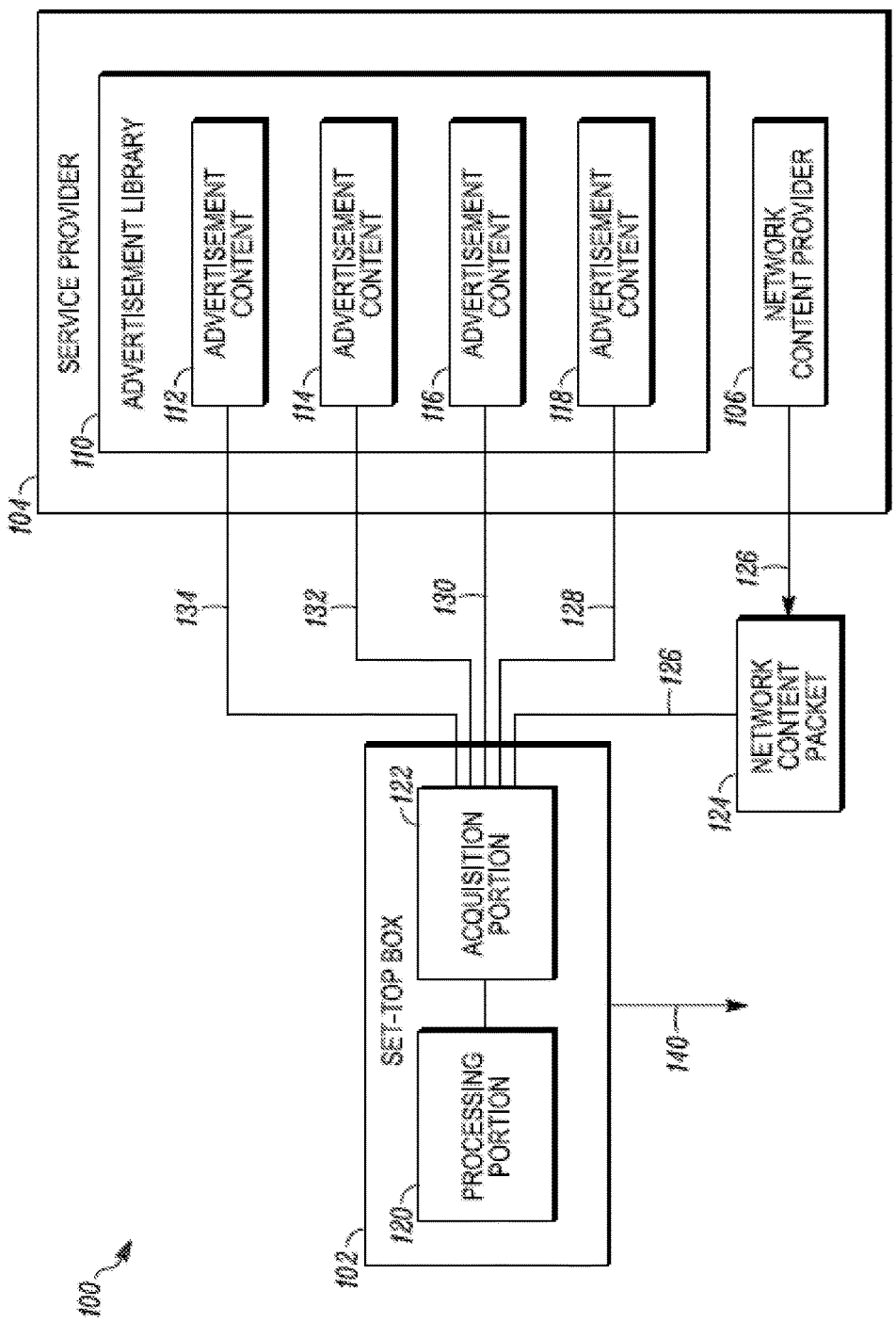
FIG. 1A illustrates an example conventional distribution system when a set-top box is arranged to receive network content.

Network content and extra network content provided by network content provider 306 is arranged to be transmitted though data stream 126. Advertisement content 310 includes advertisement content 112 as discussed above with referent to FIG. 1A in addition to an extra advertisement content component corresponding to advertisement content 112 and a still image component corresponding to advertisement content 112 as will be discussed in greater detail below. Advertisement content 310 is arranged to be transmitted through data stream 134.

Advertisement content 312 includes advertisement content 114 as discussed above with reference to FIG. 1A in addition to an extra advertisement content component corresponding to advertisement content 114 and a still image component corresponding to advertisement content 114 as will be discussed in greater detail below. Advertisement content 312 is arranged to be transmitted through data stream 132.

Advertisement content 314 includes advertisement content 116 as discussed above with referent to FIG. 1A in addition to an extra advertisement content component corresponding to advertisement content 116 and a still image component corresponding to advertisement content 116 as will be discussed in greater detail below. Advertisement content 314 is arranged to be transmitted through data stream 130.

Advertisement content 316 includes advertisement content 118 as discussed above with referent to FIG. 1A in addition to an extra advertisement content component corresponding to advertisement content 118 and a still image component corresponding to advertisement content 118 as will be discussed in greater detail below. Advertisement content 316 is arranged to be transmitted through data stream 128.

Set-top box 302 is operable to receive extra content and to present extra content while transitioning to the next data stream.

Acquisition portion 320 is arranged to receive and process data from any one of data streams 126, 128, 130, 132 and 134. Processing portion 318 is arranged to receive and process data from any one of data streams 126, 128, 130, 132 and 134 by way of acquisition portion 320. Acquisition portion 320 is operable to acquire to one of data streams 126, 128, 130, 132 and 134 and to provide content respectively thereon to processing portion 318. Buffer 322 is operable to receive extra content and image still frames from any one of data streams 126, 128, 130, 132 and 134. Buffer 322 is further operable to provide acquisition portion 320 with received extended content or image still frames as instructed by processing portion 318.

In operation, set-top box 302 is used to present desired content on a specific data stream. To accomplish this, processing portion 318 instructs acquisition portion 320 to acquire a data stream, where the desired content is being transmitted. When the data stream is acquired, acquisition portion 320 may receive and process data and output the processed data as signal 140 to a television for presentation.

In FIG. 3A, set-top box 302 is arranged to acquire data stream 126 and is receiving network content packet 324. As discussed previously, network content provider 306 arranges the content to have advertisement break 202, creating network content packet 324. In contrast to distribution system 100 discussed above, in accordance with the present invention, network content packet 324 includes extended content as will be described below. This is illustrated in FIG. 4.

Figure 4:
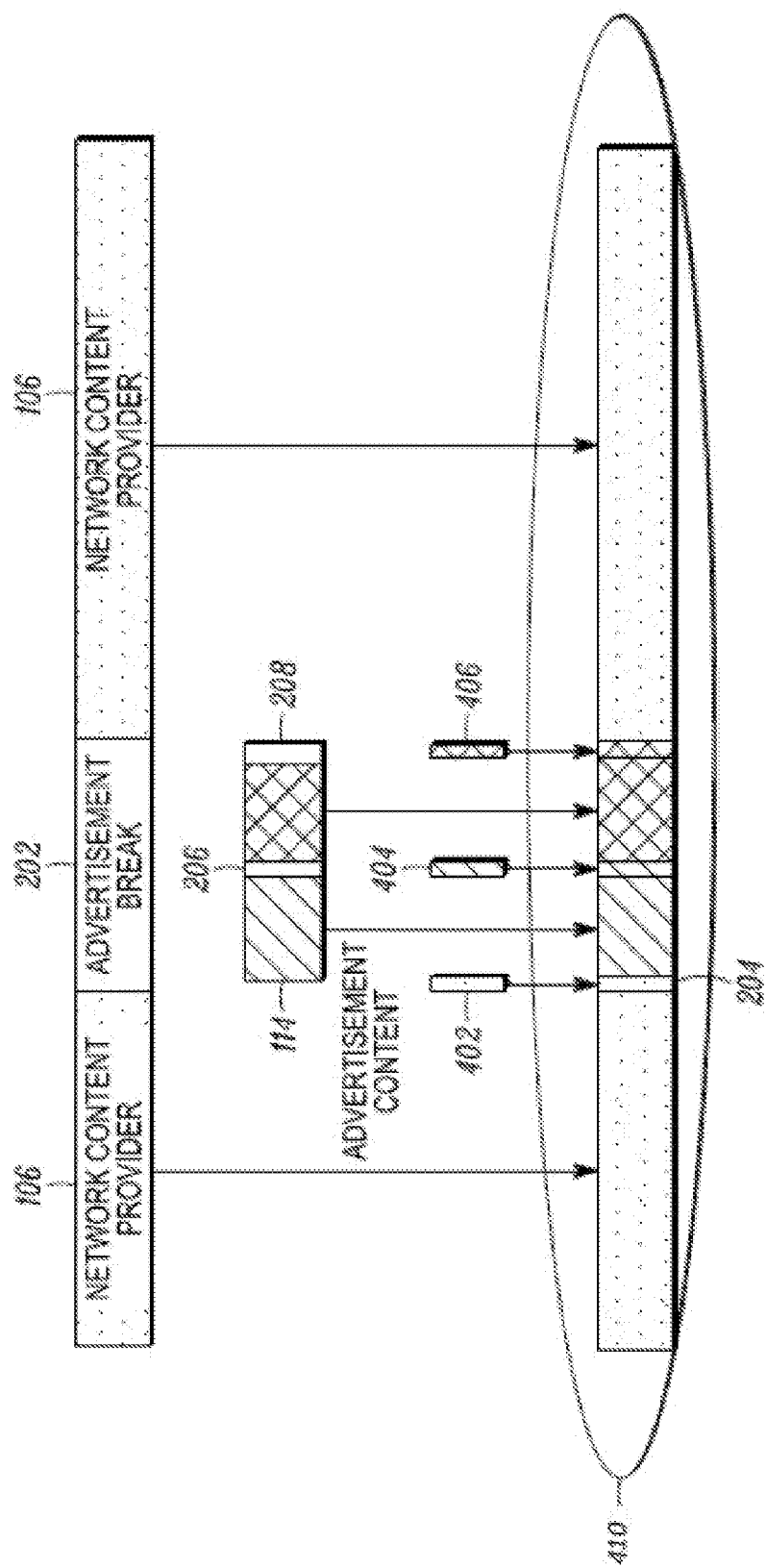
FIG. 4 illustrates an example manner of storing content, extended content and advertisements in a set-top box in accordance with an aspect of the present invention.

FIG. 4 illustrates how content, extended content and advertisements are combined in set-top box 302.

In accordance with an aspect of the present invention, dead air time is eliminated or greatly reduced by inserting additional content, while the set-top box is transitioning from one data stream to another data stream. For example, as illustrated in FIG. 4, network content provider provided by network content 306 is first presented until advertisement break 202. At this time, while set-top box 302 is transitioning to data stream 132 to receive advertisement content 312, additional content portion 402 is presented. Then, advertisement content 114 is presented until transitioning time 206. At this point, while set-top box 302 is transitioning to data stream 128 to receive advertising content 316, extra advertisement portion 404 is presented. In this example, advertisement content 312 includes advertisement content 114 and extra advertisement portion 404. Then, advertisement content 118 is presented until transitioning time 208. At this point, while set-top box 302 is transitioning to data stream 126 to receive network content provider provided by network content 306, extra advertisement portion 406 is presented. In this example, advertisement content 316 includes advertisement content 118 and extra advertisement portion 406. This process will be described in greater detail below. The string of content and advertisements presented by set-top box 302 is illustrated by final content 410.

An example structure for network content packet 324 will be further discussed with reference to FIG. 5A.

Figure 5A:
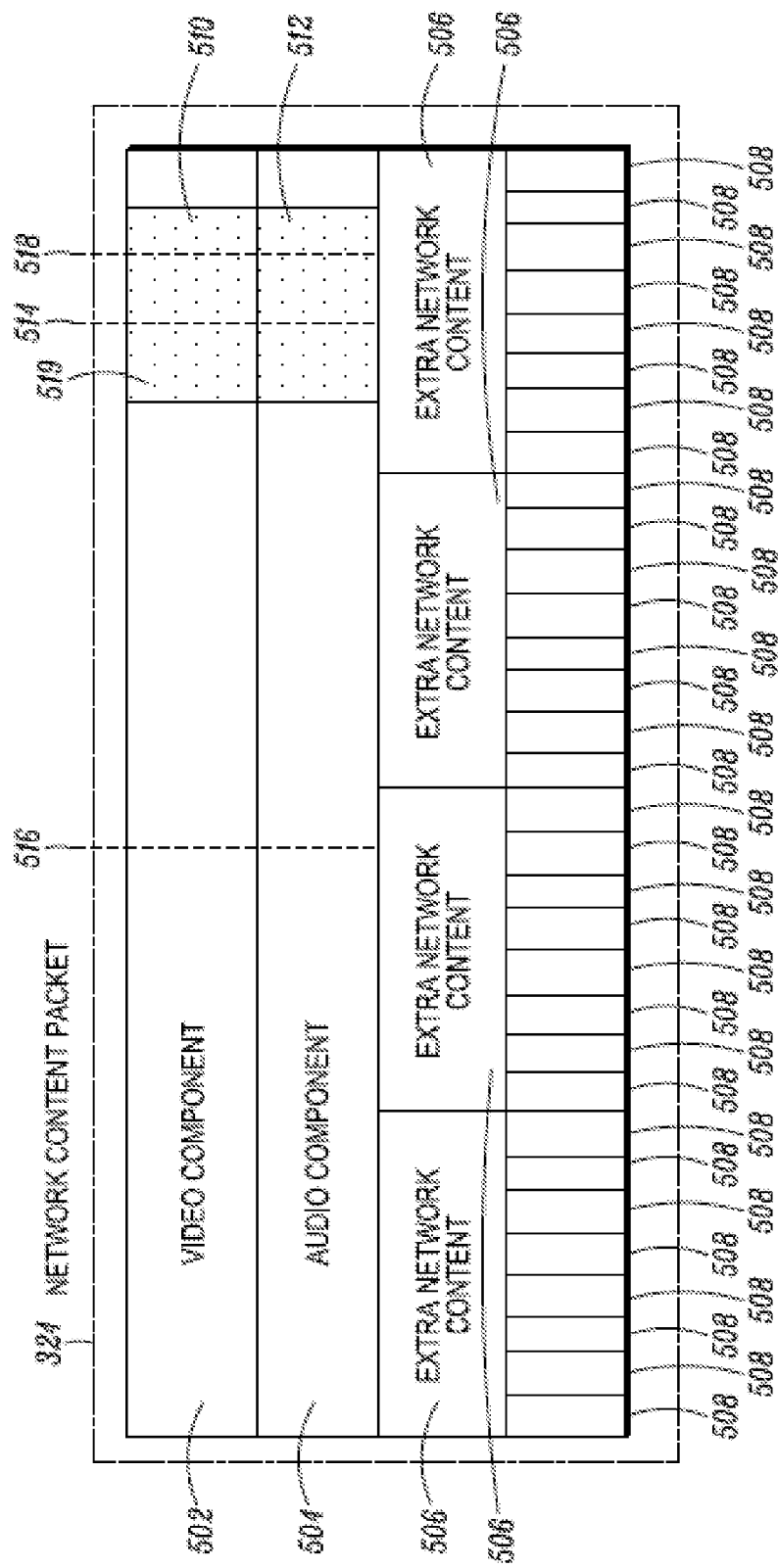
FIG. 5A illustrates an example network content packet in accordance with an aspect of the present invention.

FIG. 5A illustrates an example network content packet 324 in accordance with an aspect of the present invention.

As illustrated in the figure, network content packet 324 includes a video component 502 corresponding to the network content, an audio component 504 corresponding to the network content, extra network content component 506 corresponding to the network content, still image components 508, a transitioning space 510 corresponding to video data and a transitioning space 512 corresponding to audio data. Video component 502 and audio component 504 are components of network content provider provided by network content 306 and will be presented by set-top box 302. After some predetermined time period as represented by dotted line 514, acquisition portion 320 will have processed the portion of network content provided by network content provider 306 up to advertisement break 202. At this point, extra network content component 506 is inserted, wherein audio and video portions of extra network content component 506 will be presented into spaces 510 and 512, respectively. This figure illustrates a non-limiting example of sending packetized data wherein audio and video portions of extra network content are transmitted separately. However, in other embodiments, audio and video portions of extra network content may be transmitted as a single data packet.

Extra content may be provided as blocks of video data to be presented back for predetermined periods. For example, extra content may be packaged as 0.5 seconds, 1 second, two seconds, etc., of presentable video. These predetermined extra content packages may be concatenated to accommodate varying transitioning times as will be described in more detail below.

Extra content may be provided to a set-top box at different rates, which typically increase in cost with an increase in rate. For example, two seconds of extra content may be provided to a set-top box within a time period of 0.5 seconds. This increases delivery rate will require an increased delivery bandwidth, which generally will require an increased operation cost. However, as will be discussed in more detail below, if the extra content is provided at an increased rate, there is an increased chance that the extra content will be delivered before the next transitioning time. For purposes of explanation, presume in the example embodiments discussed with reference to FIGS. 5A-5C that extra network content component 506 is provided at slower rate than will be required for presentation. For example, as illustrated in FIG. 5A, extra network content component 506 is larger than the period for which it will present, i.e., spaces 510 and 512. Further, for purposes of explanation, presume in the example embodiments discussed with reference to FIGS. 5A-5C that extra network content component 506 has a presentation duration of 1 second and that the transitioning period of set-top box 302 is 1 second.

When set-top box 302 receives network content packet 324, buffer 322 stores extra network content component 506 and still image component 508, whereas acquisition portion 320 begins processing video component 502 and audio component 504. Once the transitioning time as represented by dotted line 514 is reached, processing portion 318 will instruct acquisition portion 320 to begin to transition to the next data stream. As discussed previously, the time a particular set-top box takes to transition from one data stream to another data stream depends on the type of set-top box and service provider being used. For this example, as mentioned above, transitioning time 204 will have a duration of 1 second. In other words, it will take acquisition portion 320 1 second to transition from data stream 126 to data stream 132. In accordance with an aspect of the present invention, set-top box 302 will simultaneously instruct buffer 322 to provide extra network content component 506 to acquisition portion 320 while instructing acquisition portion 320 to additionally begin transitioning.

Figure 1B:
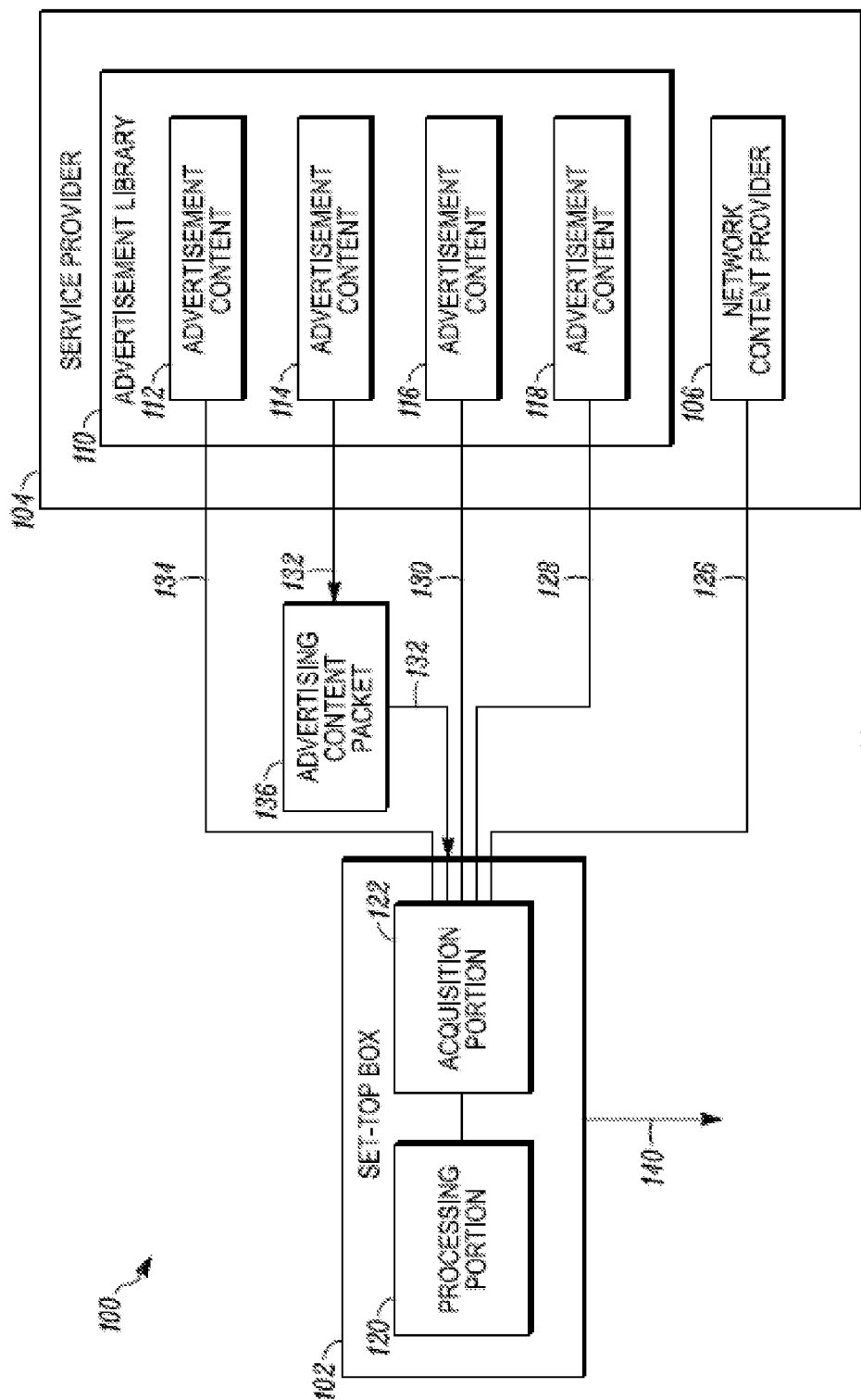
FIG. 1B illustrates the example conventional distribution system when set-top box has transitioned to a first target advertisement.
Figure 1C:
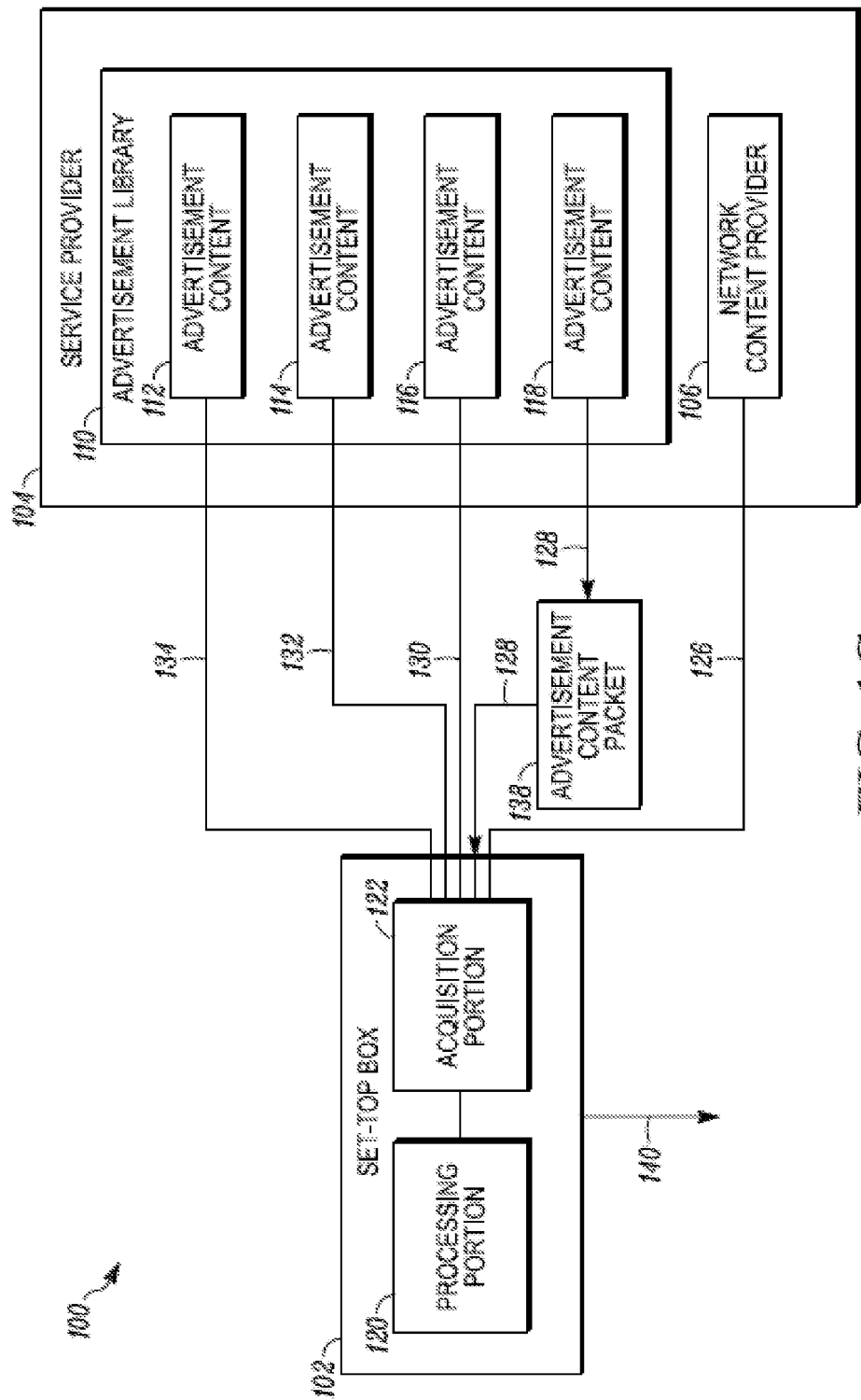
FIG. 1C illustrates the example conventional distribution system when the set-top box has transitioned to a second addressable advertisement.
Figure 2:
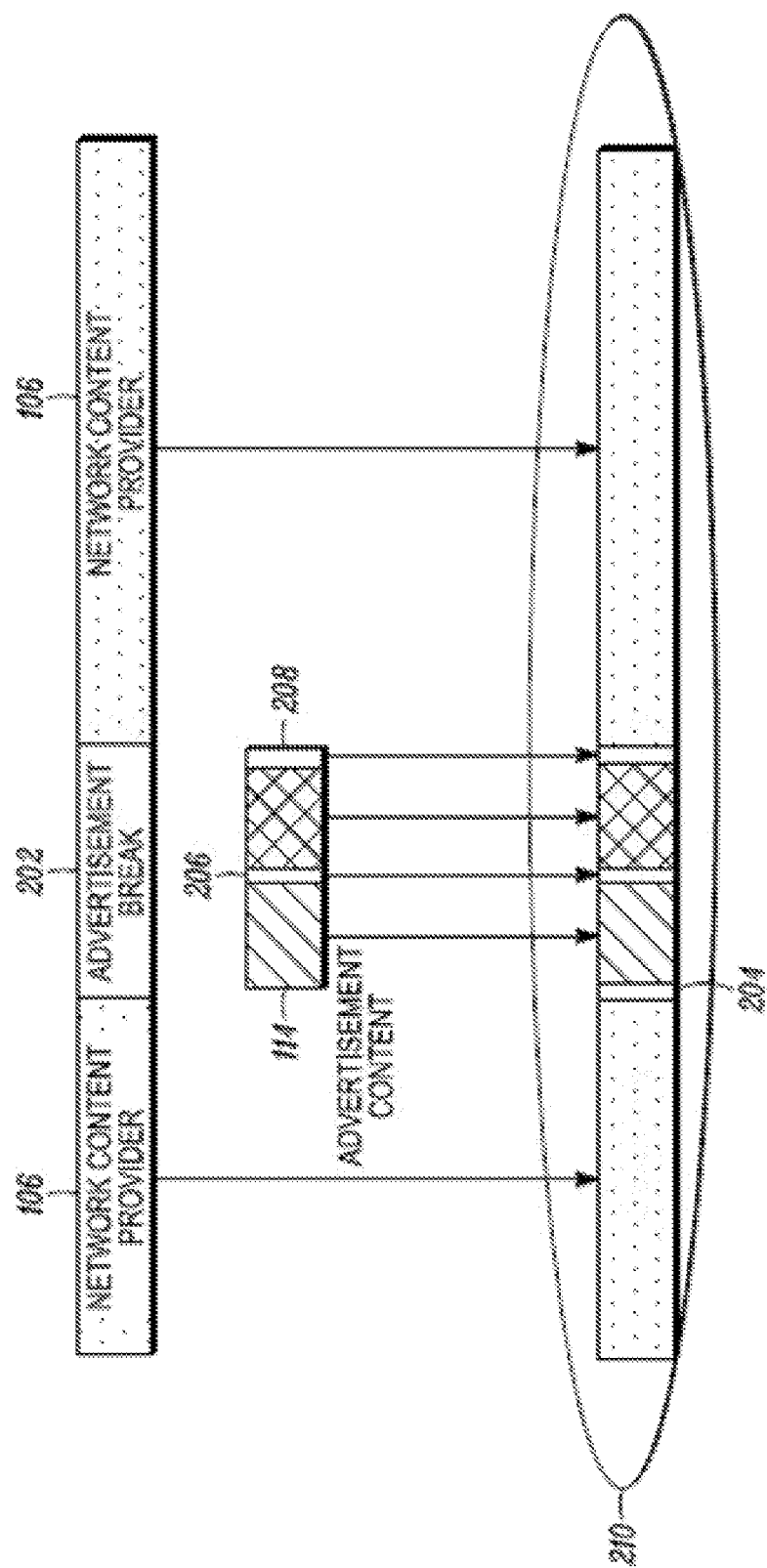
FIG. 2 illustrates how content and advertisements are combined in the set-top box of FIG. 1A.

As discussed previously, with reference to FIGS. 1A-2, set-top box 102 in delivery system 100 provided dead air while transitioning to a new data stream. In accordance with an aspect of the present invention, for example in distribution system 300, acquisition portion 320 is able to present extra network content component 506, while transitioning to the next data stream, thereby greatly reducing or eliminating the dead air time.

There may be instances where a user may transition to a specific data stream after the content has begun, e.g., a user misses the first few minutes of their favorite television show. In accordance with an aspect of the present invention, a plurality of instances of extra network content component 506 are included in network content packet 324 to address these types of situations. Presume, for purposes of discussion, that a user arranges set-top box 302 to acquire data stream 126 to watch a television show corresponding to network content provided by network content provider 306 at the time represented by dotted line 516 in FIG. 5A. In this situation, buffer 322 would not have received any of the first instance of extra network content component 506 and would not have received a large portion of the second instance of extra network content component 506. Of course, it is uncertain when a user may instruct set-top box 302 to transition to data stream 126. To account for this uncertainty, many instances of extra network content component 506 are included in network content packet 310. As such, buffer 322 will receive at least one entire extra network content component 506.

There may be instances when set-top box 302 transitions to a data stream before it receives extra content. For example, a user may instruct a set-top box to transition to a specific data stream after an advertisement break has started. In another example, a user may instruct a set-top box to transition to a specific data stream just prior to an advertisement break, wherein there is insufficient time for the extended content to be received. This time period, wherein there is insufficient time for the extended content to be received, is represented in FIG. 5A as shaded area 519. In accordance with an aspect of the present invention, a plurality of instances of still image component 508 are included in network content packet 324 to address these types of situations. Presume, for purposes of discussion, that a user instructs a set-top box 302 to transition to data stream 126 to watch a television show corresponding to network content provided by network content provider 306 at the time represented by dotted line 518 in FIG. 5A. In this situation, extra network content component 506 would not fit in the remaining time slot allotted for acquisition portion 320 to transition to the next data stream. As opposed to presenting dead air, buffer 322 will at least be able to load still image component 508 into acquisition portion 320 for presentation. Of course, it is uncertain when a user may instruct set-top box 302 to transition to data stream 126. To account for this uncertainty, many instances of still image component 508 are included in network content packet 324. As such, buffer 322 will receive at least one entire still image component 508.

Figure 3B:
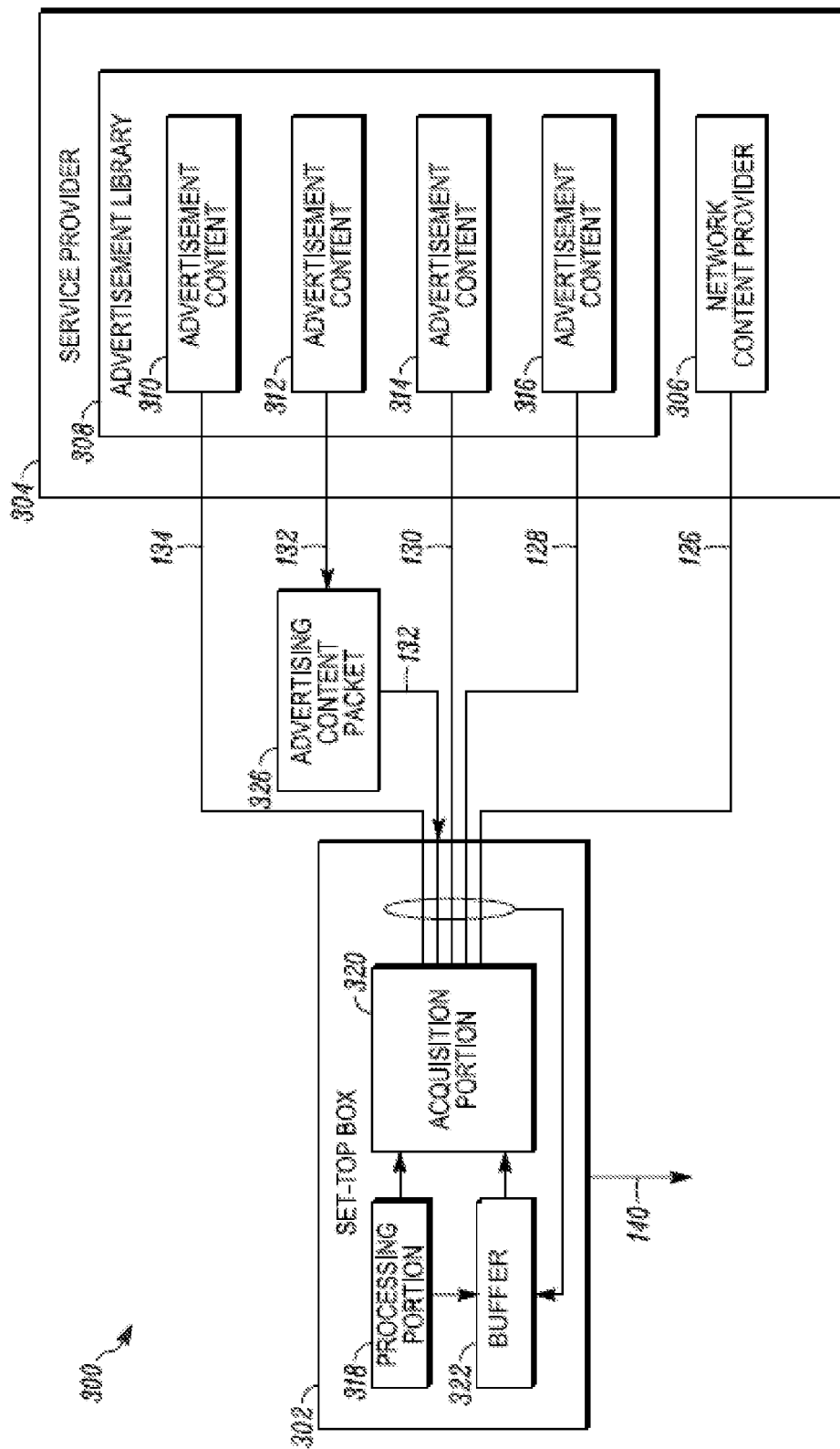
FIG. 3B illustrates an example distribution system in accordance with an aspect of the present invention, after transitioning to a first advertisement data stream.

FIG. 3B illustrates distribution system 300 when transitioned to the first advertisement data stream.

As illustrated in the figure, network content packet 324 is no longer being transmitted to set-top box 302. Set-top box 302 has now transitioned to data stream 132 and is receiving an advertisement content packet 326. Advertisement content packet 326 includes similar elements as advertisement content packet 136, but further includes an extra advertisement portion.

Figure 5B:
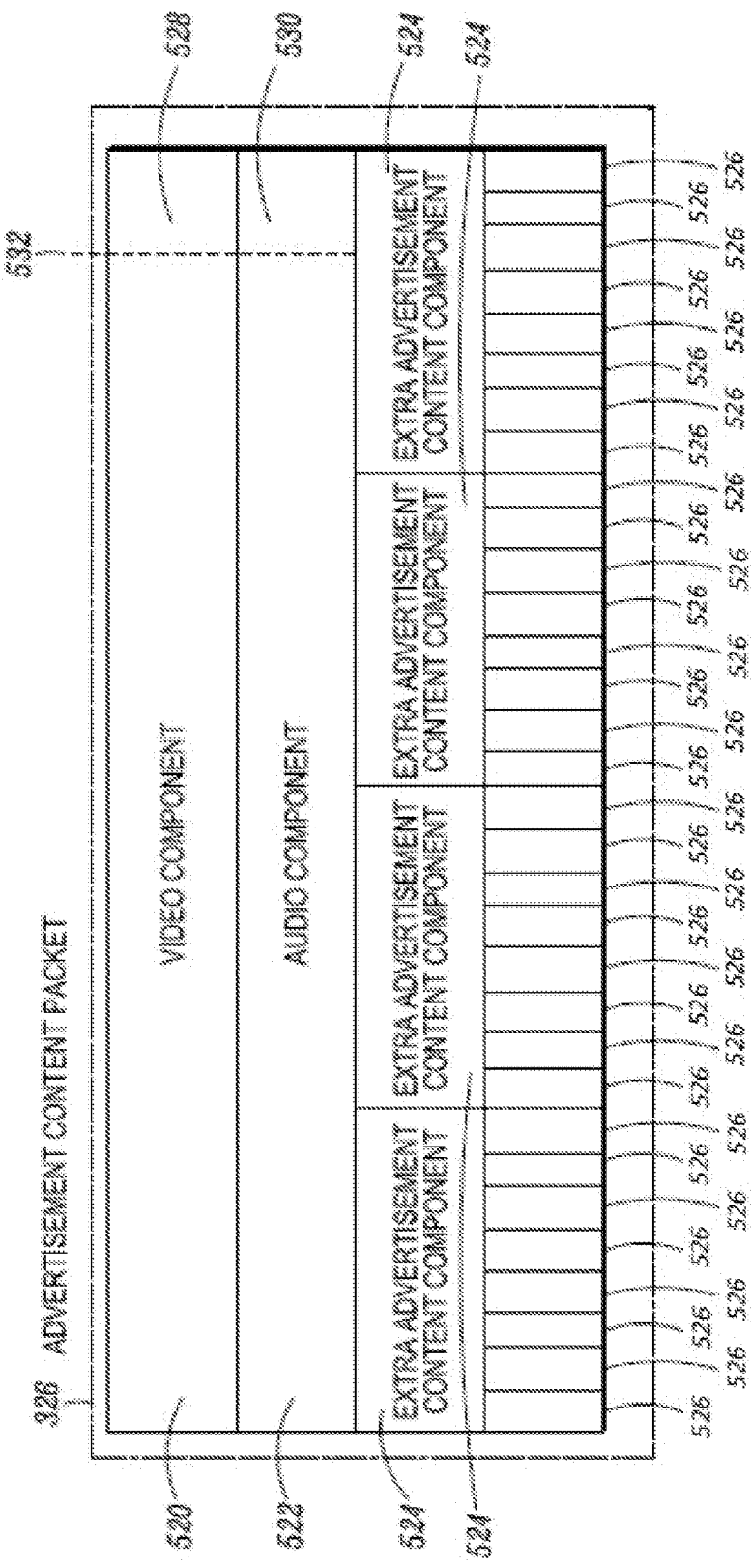
FIG. 5B illustrates an example advertisement content packet in accordance with an aspect of the present invention.

FIG. 5B illustrates an example advertisement content packet 326 in accordance with an aspect of the present invention.

As illustrated in the figure, advertisement content packet 326 includes a video component 520 corresponding to the advertisement content, an audio component 522 corresponding to the advertisement content, extra advertisement content component 524 corresponding to the advertisement content, still image components 526, a transitioning space 528 corresponding to video data and a transitioning space 530 corresponding to audio data. Video component 520 and audio component 522 are components of advertisement content packet 326 and will be presented by set-top box 302. After a predetermined time period as represented by dotted line 532, acquisition portion 320 will have processed advertisement content packet 326 up to transitioning point 532. At this point, extra advertisement content component 524 is inserted, wherein audio and video portions of extended advertisement component 524 will be presented into spaces 528 and 530, respectively.

When set-top box 302 receives advertisement content packet 326, buffer 322 stores extra advertisement content component 524 and still image component 526, while acquisition portion 320 begins processing video component 520 and audio component 522. Once the transitioning time as represented by dotted line 532 is reached, processing portion 318 will instruct acquisition portion 320 to begin to transition to the next data stream. For this example, transitioning time 206 will have a duration of 1 second. In other words, it will take acquisition portion 320 1 second to transition from data stream 132 to data stream 128. In accordance with an aspect of the present invention, processing portion 318 will concurrently instruct buffer 322 to provide extra advertisement content component 524 to acquisition portion 320, while instructing acquisition portion 320 to additionally begin transitioning.

In accordance with an aspect of the present invention, for example in distribution system 300, acquisition portion 320 is able to present extra advertisement content component 524, while transitioning to the next data stream, thereby greatly reducing or eliminating the dead air time.

In the event that extra advertisement content component 524 is not available to be presented, set-top box 302 will instead present still image 526.

Figure 3C:
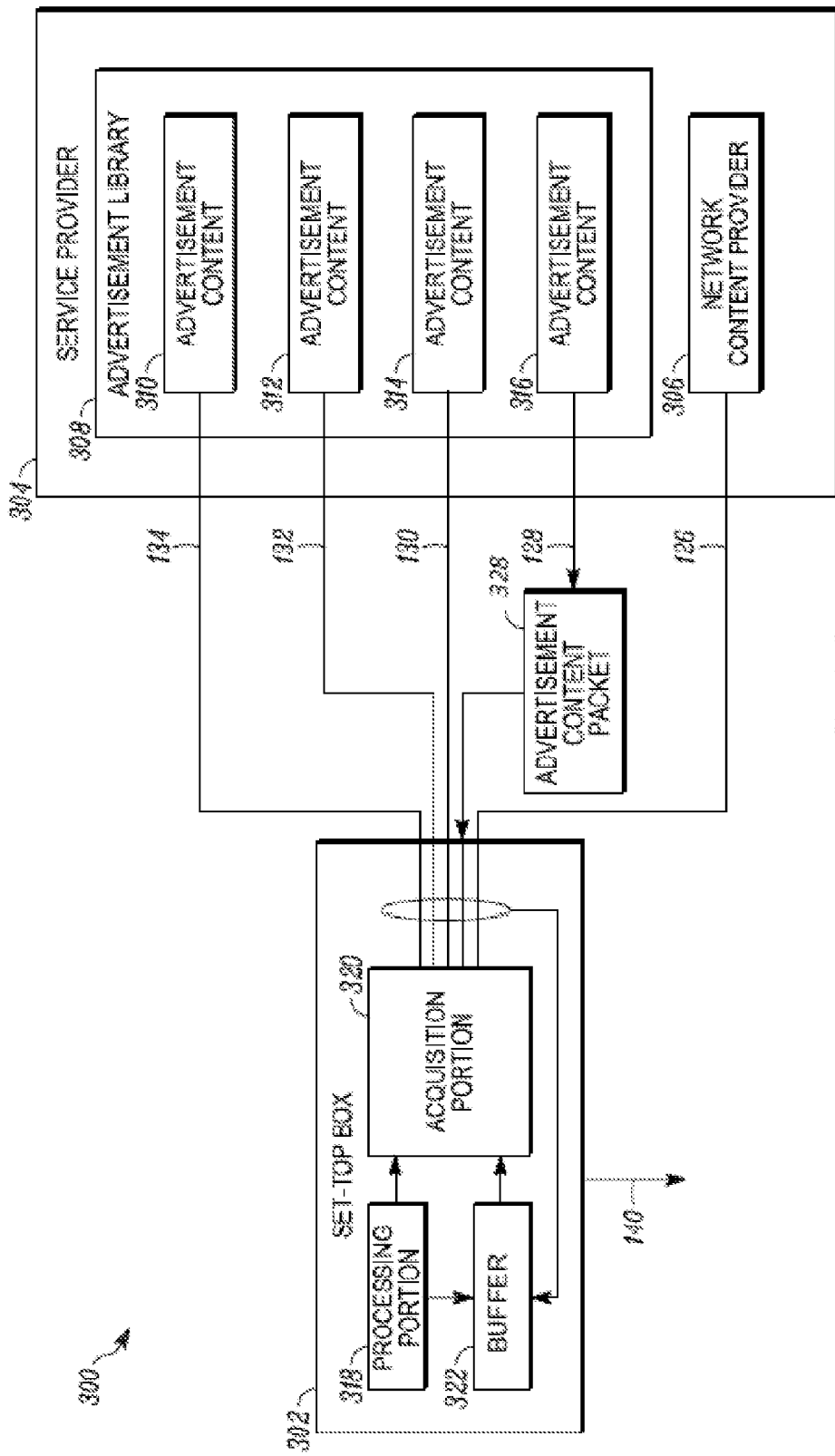
FIG. 3C illustrates an example distribution system in accordance with an aspect of the present invention, after transitioning to a second advertisement data stream.

FIG. 3C illustrates distribution system 300 when set-top box 302 has transitioned to the second advertisement data stream.

As illustrated in the figure, advertisement content packet 326 is no longer being transmitted to set-top box 302. Set-top box 302 has now transitioned to data stream 128 and is receiving an advertisement content packet 328. Advertisement content packet 328 includes similar elements as advertisement content packet 138, but further includes an extended advertisement portion for advertisement content 316.

Figure 5C:
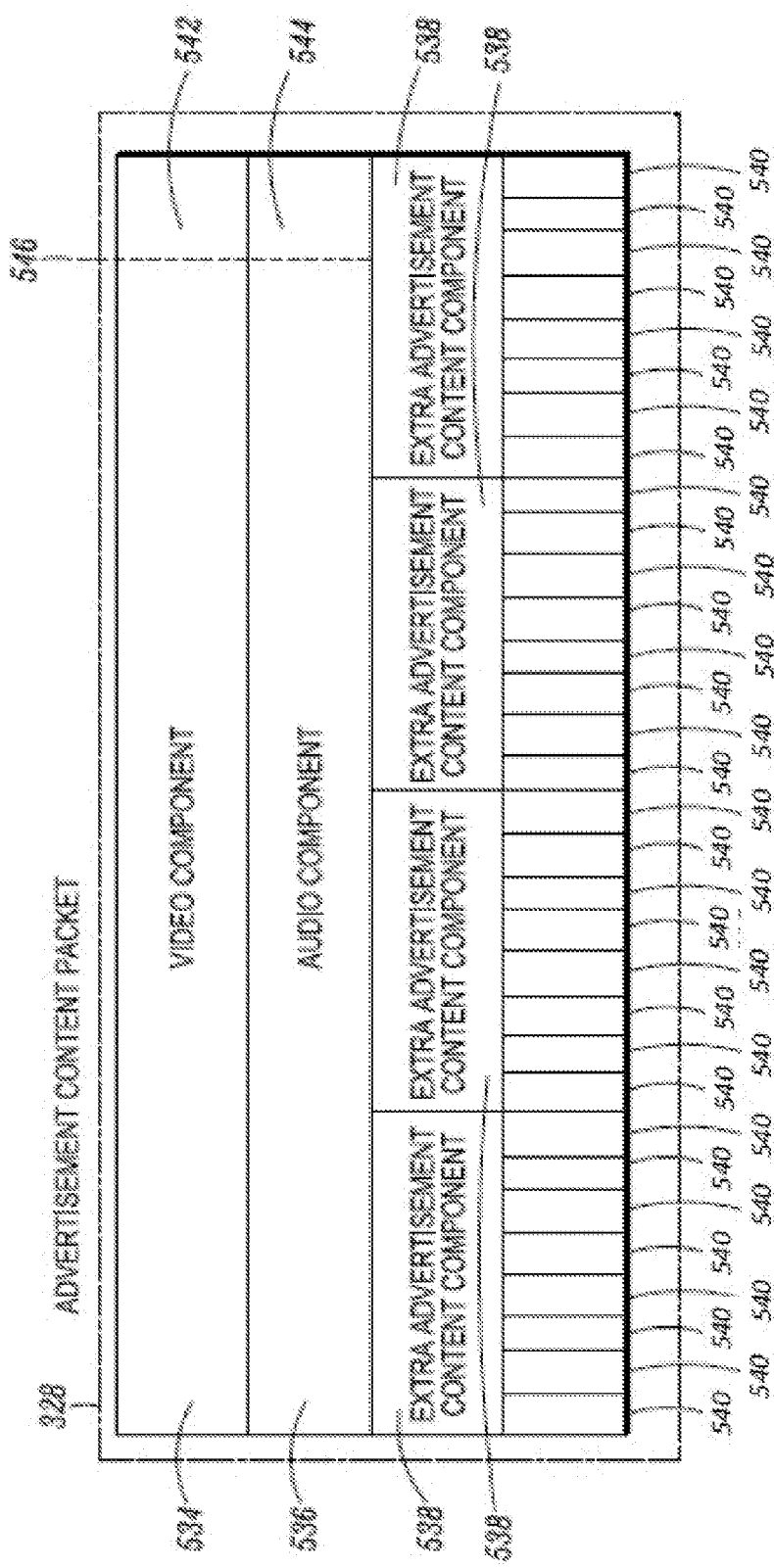
FIG. 5C illustrates another example advertisement content packet in accordance with an aspect of the present invention.

FIG. 5C illustrates an example advertisement content packet 328 in accordance with an aspect of the present invention.

As illustrated in the figure, advertisement content packet 328 includes a video component 534 corresponding to the advertisement content, an audio component 536 corresponding to the advertisement content, extra advertisement content component 538 corresponding to the advertisement content, still image components 540, a transitioning space 542 corresponding to video data and a transitioning space 544 corresponding to audio data. Video component 534 and audio component 536 are components of advertisement content 316 and will be presented by set-top box 302. After a predetermined time period as represented by dotted line 546, acquisition portion 320 will have processed advertisement content 308 up to transitioning point 206. At this point, extra advertisement content component 538 is inserted, wherein audio and video portions of extended advertisement component 538 will be presented into spaces 542 and 544, respectively.

When set-top box 302 receives advertisement content packet 328, buffer 322 stores extra advertisement content component 538 and still image component 534, whereas acquisition portion 320 begins processing video component 534 and audio component 536. Once the transitioning time as represented by dotted line 546 is reached, processing portion 318 will instruct acquisition portion 320 to begin to transition to the next data stream. For this example, transitioning time 208 will have a duration of 1 second. In other words, it will take acquisition portion 320 1 second to transition from data stream 128 to data stream 126. In accordance with an aspect of the present invention, processing portion 318 will concurrently instruct buffer 322 to provide extra advertisement content component 538 to acquisition portion 320, while instructing acquisition portion 320 to additionally begin transitioning.

In accordance with an aspect of the present invention, for example in distribution system 300, acquisition portion 320 is able to present extra advertisement content component 538, while transitioning to the next data stream, thereby greatly reducing or eliminating the dead air time.

In the event that extra advertisement content component 538 is not available to be presented, set-top box 302 will instead present still image 540.

As previously discussed, the time needed for set-top box 302 to transition to another data stream depends on the type of set-top box and service provider being used. For instance, there may be situations where a set-top box is able to transition to the next data stream in more than one second, such as in two seconds. In accordance with another aspect of the present invention, advertising content may be provided with a plurality of portions of extra content, wherein additional portions of extra content may be concatenated to accommodate a specific transitioning speed of a set-top box. An example of this aspect will be further discussed with reference to FIG. 6.

Figure 6:
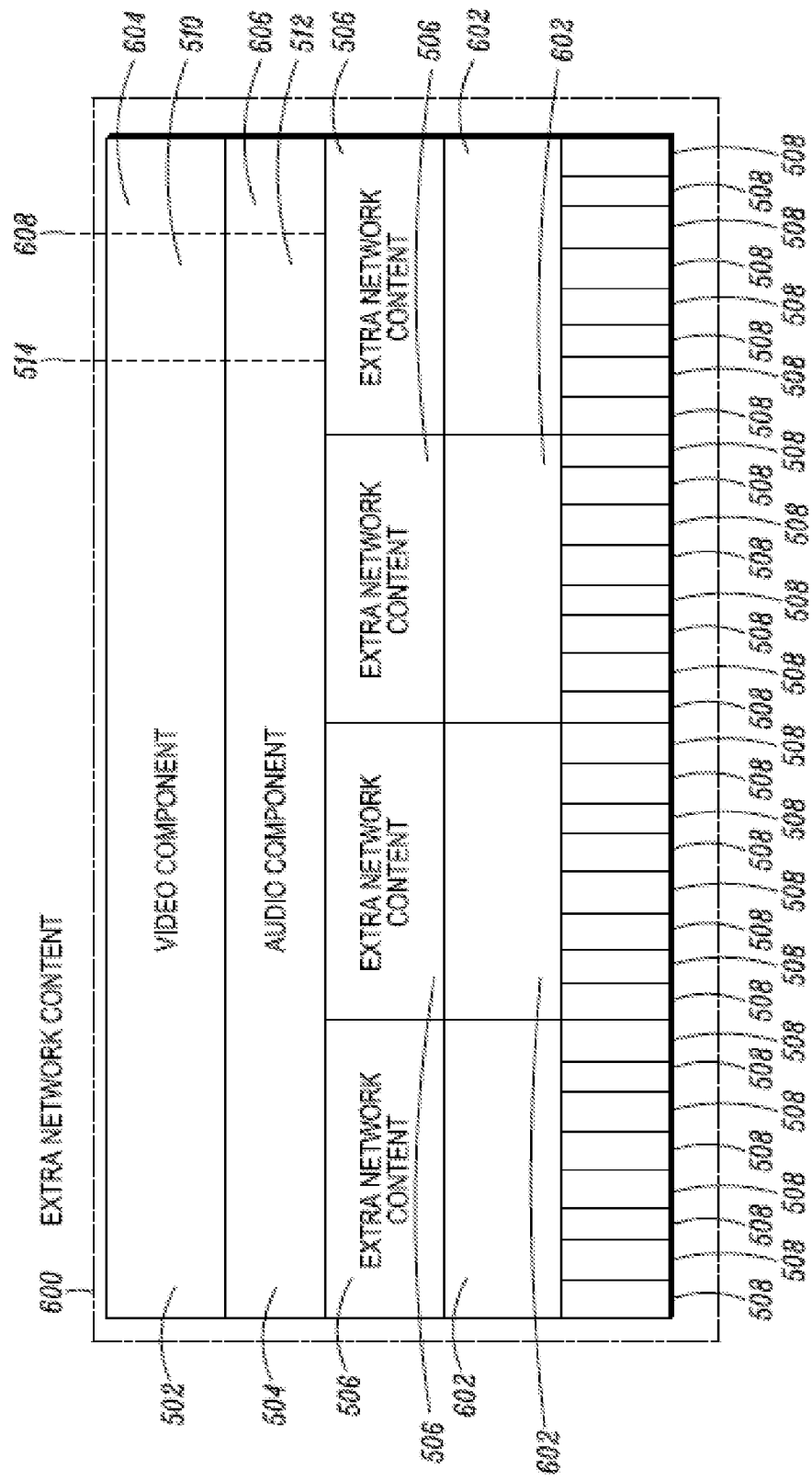
FIG. 6 illustrates an advertisement content packet for use with one to two different set-top boxes, in accordance with an aspect of the present invention.

FIG. 6 illustrates an advertisement content packet 600 for use with either set-top box 302 or another set-top box (not shown), which requires two seconds to transition to the next data stream.

As illustrated in the figure, advertisement packet 600 includes the elements of advertisement content packet 326 as illustrated in FIG. 5B, in addition to an extra advertisement content 602. In this example, all advertisements are 28 seconds in length. Extra advertisement content 602 includes an additional 1 second of audio and video pertaining to advertisement content packet 326.

By using advertisement packet 600, set-top box 302 may present extra network content 506 for one second while transitioning to a new data stream as discussed above. Further, the other set-top box (not shown), which requires two seconds to transition to the next data stream, may present extra network content 506 for one second and then extra content 602 for one second while transitioning to the new data stream. More specifically, after 28 seconds as represented by dotted line 514, the content for advertisement content packet 326 will be complete. At this point, the other set-top box will present dead air for one second. Then, as represented by dotted line 608, present extra content component 602 is inserted, wherein audio and video portions will be presented into space 604 and 606.

Figure 7B:
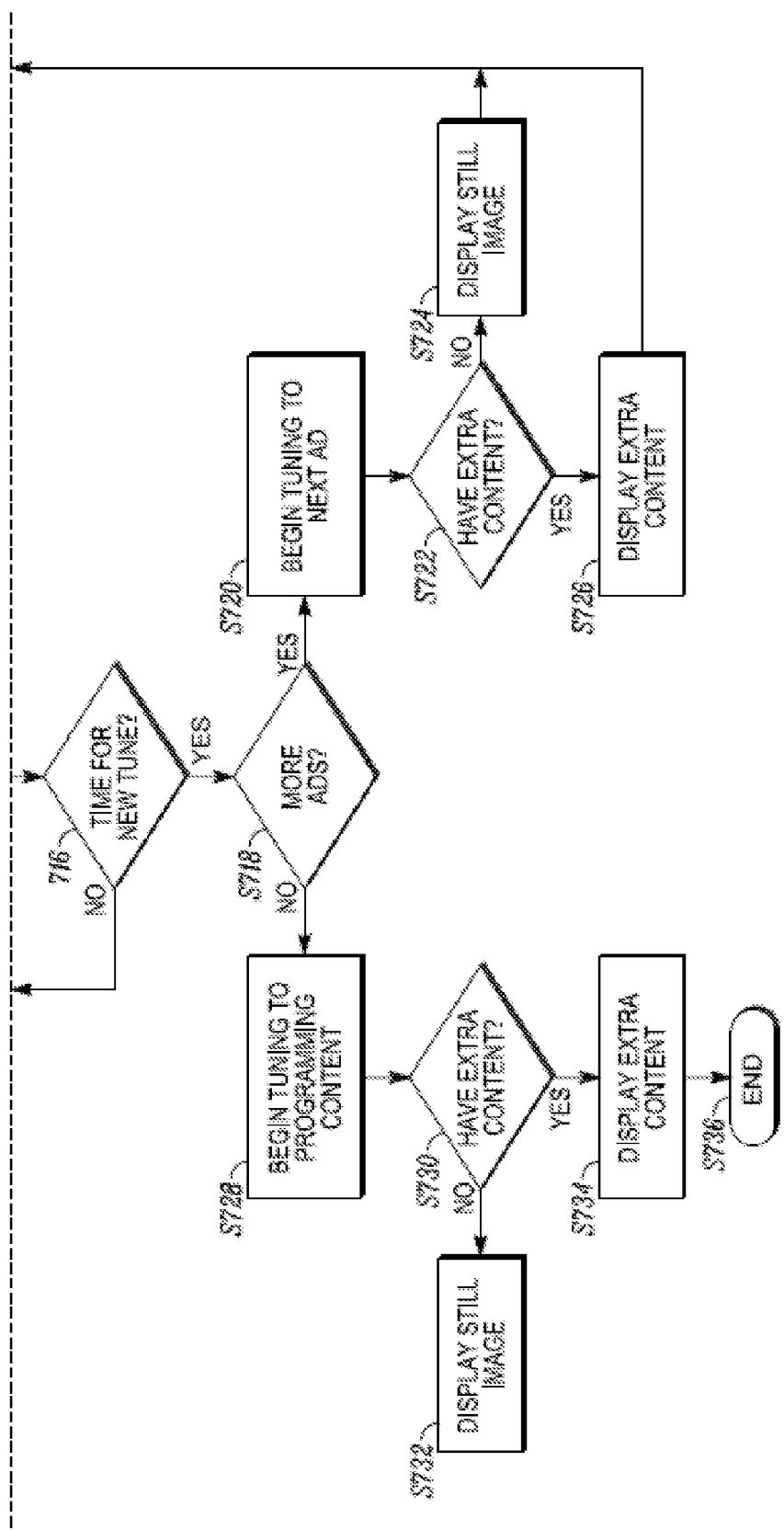
FIG. 7A/B illustrates an example process of presenting targeting advertising in accordance with an aspect of the present invention.

An example process of presenting targeting advertising in accordance with an aspect of the present invention will now be discussed with reference to FIG. 7A/B.

As illustrated in the figure, example process 700 starts (S702) and set-top box 302 receives content (S704). As discussed with reference to FIG. 3A, set-top box 302 is arranged to acquire data stream 126 and receives a network content packet 324 from service provider 304. At this point, as illustrated in FIG. 5A, extended network content component 506 and still image component 508 are stored in buffer 322.

Set-top box 302 then presents network content provided by network content provider 306 within network content packet 324 (S706). In this example, acquisition portion 320 processes video component 502 and audio component 504. The processed components are sent as signal 140 to a device (not shown) to present the content for a user. Set-top box 302 can use any known devices (not shown) that is operable to present the content, a non-limiting example of which includes a television.

While set-top box 302 is presenting network content provided by network content provider 306, it determines whether there is an advertisement break in network content provided by network content provider 306 (S708). If there is no advertisement break, set-top box 302 continues to present network content provided by network content provider 306.

If it is determined that there is an advertisement break, for example at advertisement break 202, processing portion 318 instructs acquisition portion 320 to transition to the appropriate advertisement data stream (S710). As discussed previously, the advertisements that will be presented during the advertisement break have been predetermined.

Once acquisition portion 320 has transitioned to the appropriate data stream, it begins to receive the advertisement content packet (S712), for example as discussed above with reference to FIG. 3B.

As set-top box 302 is receiving the advertisement packet, it begins to present the advertisement content (S714).

It is then determined whether acquisition portion 320 should transition to a new data stream (S716). If not, as previously discussed, acquisition portion 320 continues to process the current advertisement packet until the predetermined transitioning time for the next advertisement packet.

If it is determined that it is time to transition to the new data stream, it is then determined whether acquisition portion 320 should transition to a new advertisement data stream or back to the network content data stream (S718).

In the instance there are more advertisements to be presented, set-top box 302 begins to transition to the next advertisement data stream (S720). Processing portion 318 instructs acquisition portion 320 to transition to the next data stream.

After processing portion 318 begins transitioning, it is then determined whether is extra advertisement content to be presented (S722). If the event buffer 322 includes the extra advertisement content, the extra advertisement content is provided to acquisition portion 320 for processing (S726). Otherwise, buffer provides the still image to acquisition portion 320 for processing (S724).

Returning to step S718, if it is determined that acquisition portion 320 should transition back to the network content data stream, processing portion 318 instructs acquisition portion 320 to transition back to the network content data stream (S728).

After processing portion 318 begins transitioning, it is then determined whether is extra advertisement content is to be presented (S730). If the event buffer 322 includes the extra advertisement content, the extra advertisement content is provided to acquisition portion 320 for processing (S734). Otherwise, buffer provides the still image to acquisition portion 320 for processing (S732).

At this time set-top box resumes presenting the network content and process 700 stops (S736).

In example embodiments discussed above with reference to FIGS. 3A-3C, service provider 304 provides five (5) data streams to set-top box 302. Of course service provider 304 may provide any number of data streams to set-top box 302.

In accordance with aspects of the present invention, data streams 126, 128, 130, 132 and 134 may be wired or wireless.

In example embodiments discussed above with reference to FIGS. 3A-3C, service provider 304 provides content, extra content and still images on a single data stream, e.g., data stream 126. In accordance with aspects of the present invention content, extra content and still images may be provided on different data streams, e.g., wherein data stream 126 includes a plurality of data streams.

In accordance with aspects of the present invention, extra content may be spliced onto the end of corresponding content such that the extra content is presented during a transitioning operation. The splicing operation may be performed by any known method.

In some non-limiting example embodiments, the extra content may be an additional portion of the current content. For example, for a pre-recorded network broadcast, the transitioning time will be known. Further, the following two seconds of the pre-recorded network broadcast will additionally be stored. In this example situation, the known extra network content may be spliced onto the end of the network content at the transitioning time. This would seem to extend the network broadcast while concurrently reducing dead air time.

In some non-limiting example embodiments, the extra content may be different from the current content. For example, for a live network broadcast such as a sporting event, there would be no way to predict what will happen after the transitioning time. In this example situation, different content, such as an advertisement, may be spliced onto the end of the network content at the transitioning time. This would, at the very least, reducing dead air time and provide an additional source of revenue to service providers.

In example embodiments discussed above with reference to FIGS. 3A-3C, processing portion 318, acquisition portion 320 and buffer 322 are illustrated as distinct items. However, in other embodiments, at least one of processing portion 318, acquisition portion 320 and buffer 322 may be combined as a unitary device. In still other embodiments, the function of at least one of processing portion 318 and acquisition portion 320 may be performed by a single processing device. In these embodiments, the single processing device may receive instructions from a media, having processing device readable instructions thereon. The device readable instructions may instruct the processing device to perform the functions of at least one of processing portion 318 and acquisition portion 320.

In example embodiments discussed above with reference to FIGS. 3A-3C, service provider 304 provides extra content to set-top box 302. In other non-limiting example embodiments in accordance with aspects of the present invention, set-top box 302 may obtain extra content from other sources. For example, set-top box 302 may have extra content loaded therein, wherein the extra content is presented during every transitioning process. Further, set-top box 302 may have its own database of extra content to present during every transitioning process. In such situations, service provider 304 need not provide extra content to set-top box 302.

In a conventional system and method of providing addressable advertising to a set-top box, dead air was created when the set-top box transitions from one data stream to the next. In accordance with an aspect of the present invention, extra content is provided to the set-top box. This extra content will present while the set-top box is transitioning to a new data stream. This additional content may be a source of additional revenue of service providers.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
receiving, by a set-top box, a request for a transition from a first data stream comprising first content data to a second data stream comprising second content data, wherein the transition occurs within a transitioning time period;
providing, by the set-top box, an output signal comprising an insertion content to a presentation device for seamless viewing of the transition between the first data stream and the second data stream, wherein providing the output signal to the presentation device comprises:
determining whether there is sufficient time to receive a first portion of extended content data relative to the transitioning time period;
selecting the first portion of the extended content data as the insertion content in response to determining that there is sufficient time to receive the first portion of the extended content data;
selecting a second portion of the extended content data as the insertion content in response to determining that there is insufficient time to receive the first portion of the extended content data;
creating the output signal comprising the insertion content; and
causing the insertion content from the output signal to be presented to the presentation device during the transition from the first data stream to the second data stream.

2. The method of claim 1, wherein the insertion content has a presentation period that is less than or equal to the transitioning time period.

3. The method of claim 2, wherein each of the first portion of the extended content data and the second portion of the extended content data corresponds to a presentation period that is less than the transitioning time period.

4. The method of claim 2, wherein the insertion content comprises the first portion of the extended contend data and the second portion of the extended content data.

5. The method of claim 1, wherein the extended content data comprises a still image.

6. The method of claim 1, wherein the extended content data comprises a video.

7. The method of claim 1, wherein a complete play time of the first content data with the insertion content is longer than a complete play time of the first content data without the insertion content.

8. A system comprising:
a memory device;
a processing device coupled to the memory device, the processing device to:
receive a request for a transition from a first data stream comprising first content data to a second data stream comprising second content data, wherein the transition occurs within a transitioning time period;
provide an output signal comprising an insertion content to a presentation device for seamless viewing of the transition between the first data stream and the second data stream, wherein to provide the output signal to the presentation device, the processing device is to:
determine whether there is sufficient time to receive a first portion of extended content data relative to the transitioning time period;
select the first portion of the extended content data as the insertion content in response to determining that there is sufficient time to receive the first portion of the extended content data;
select a second portion of the extended content data as the insertion content in response to determining that there is insufficient time to receive the first portion of the extended content data;
create the output signal comprising the insertion content; and
cause the insertion content from the output signal to be presented to the presentation device during the transition from the first data stream to the second data stream.

9. The system of claim 8, wherein the insertion content has a presentation period that is less than or equal to the transitioning time period.

10. The system of claim 9, wherein each of the first portion of the extended content data and the second portion of the extended content data corresponds to a presentation period that is less than the transitioning time period.

11. The system of claim 9, wherein the insertion content comprises the first portion of the extended contend data and the second portion of the extended content data.

12. The system of claim 8, wherein the extended content data comprises a still image.

13. The system of claim 8, wherein the extended content data comprises a video.

14. The system of claim 8, wherein a complete play time of the first content data with the insertion content is longer than a complete play time of the first content data without the insertion content.

15. A non-transitory device-readable medium storing instructions that, when executed by a processing device, cause the processing device to perform operations comprising:
receiving a request for a transition from a first data stream comprising first content data to a second data stream comprising second content data, wherein the transition occurs within a transitioning time period;
providing an output signal comprising an insertion content to a presentation device for seamless viewing of the transition between the first data stream and the second data stream, wherein providing the output signal to the presentation device comprises:
determining whether there is sufficient time to receive a first portion of extended content data relative to the transitioning time period;
selecting the first portion of the extended content data as the insertion content in response to determining there is sufficient time to receive the first portion of the extended content data;
selecting a second portion of the extended content data as the insertion content in response to determining that there is insufficient time to receive the first portion of the extended content data;
creating the output signal comprising the insertion content; and
causing the insertion content from the output signal to be presented to the presentation device during the transition from the first data stream to the second data stream.

16. The non-transitory device-readable medium of claim 15, wherein the insertion content has a presentation period that is less than or equal to the transitioning time period.

17. The non-transitory device-readable medium of claim 15, wherein each of the first portion of the extended content data and the second portion of the extended content data corresponds to a presentation period that is less than the transitioning time period.

18. The non-transitory device-readable medium of claim 15, wherein the insertion content comprises the first portion of the extended contend data and the second portion of the extended content data.

19. The non-transitory device-readable medium of claim 15, wherein the extended content data comprises a still image.

20. The non-transitory device-readable medium of claim 15, wherein a complete play time of the first content data with the insertion content is longer than a complete play time of the first content data without the insertion content.

* * * * *